United States Patent
Alexander, Jr. et al.

(10) Patent No.: US 6,671,253 B1
(45) Date of Patent: Dec. 30, 2003

(54) METHOD AND SYSTEM FOR PROVIDING PEER REDUNDANCY TO ASYNCHRONOUS TRANSFER MODE EMULATED LOCAL-AREA NETWORKS

(75) Inventors: Cedell Adam Alexander, Jr., Durham, NC (US); John Kevin Frick, Raleigh, NC (US); Edward Joel Rovner, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,204

(22) Filed: Sep. 21, 1999

(51) Int. Cl.[7] .............................................. G01R 31/08
(52) U.S. Cl. ................... 370/217; 370/218; 370/219; 370/220; 370/395.1; 709/239
(58) Field of Search .......................... 370/216, 217, 370/218, 219, 220, 241, 242, 244, 351, 466, 248, 395.1; 709/239

(56) References Cited

U.S. PATENT DOCUMENTS

| | | |
|---|---|---|
| 5,280,481 A | 1/1994 | Chang et al. |
| 5,323,388 A | 6/1994 | Chang et al. |
| 5,357,508 A | 10/1994 | Le Boudec et al. |
| 5,577,033 A | 11/1996 | Chang et al. |
| 5,581,552 A | 12/1996 | Civanlar et al. |
| 5,600,644 A | 2/1997 | Chang et al. |
| 5,600,650 A | 2/1997 | Oskouy |
| 5,652,833 A * | 7/1997 | Takizawa et al. |
| 5,949,753 A * | 9/1999 | Alexander, Jr. et al. |
| 5,949,783 A * | 9/1999 | Husak et al. |
| 5,982,773 A * | 11/1999 | Nishimura et al. |
| 6,199,033 B1 * | 3/2001 | Tanaka |
| 6,202,169 B1 * | 3/2001 | Razzaghe-Ashrafi et al. |
| 6,222,820 B1 * | 4/2001 | Hamami |
| 6,223,149 B1 * | 4/2001 | Margulis et al. |
| 6,226,297 B1 * | 5/2001 | Alexander et al. |
| 6,269,076 B1 * | 7/2001 | Shamir et al. |
| 6,289,017 B1 * | 9/2001 | Shani et al. |

OTHER PUBLICATIONS

Bill Ellington et al., "Implementing ATM Forum–Compliant LAN Emulation," IBM Corporation, Digital Communications Design Conference, 1996.

IBM Technical Disclosure Bulletin, "Method for Improving Network Availability with Redundant Network Servers," vol. 39, No. 8, Aug. 1996, pp. 195–196.

IBM Technical Disclosure Bulletin, "Addressing Source Routing in an ATM Emulated LAN," vol. 37, No. 10, Oct. 1994, pp. 75–80.

IBM Technical Disclosure Bulletin, "Transmission Control Protocol/Internet Protocol Networking Over Netbios," vol. 36, No. 12, Dec. 1993, pp. 619–620.

* cited by examiner

Primary Examiner—Douglas Olms
Assistant Examiner—Steven Blount
(74) Attorney, Agent, or Firm—Gerald R. Woods

(57) ABSTRACT

A method and system for providing enhanced peer redundancy in an ATM emulated local area network (ELAN) served by a primary LAN emulation server (LES), a peer LAN emulation server, a broadcast and unknown server (BUS), and a LAN emulation configuration server (LECS). An enhanced peer redundancy virtual channel connection (VCC) is established between the primary LES/BUS and the peer LES/BUS. The primary LES/BUS and the peer LES/BUS exchange status messages every two seconds indicating the number of assigned LECs. If the primary has fewer LECs than the peer, the primary yields to the peer as the active LES/BUS. If an enhanced redundancy VCC was not established, the backup LES/BUS provides ELAN services while waiting for the primary to call to establish an enhanced redundancy VCC. If an enhanced peer redundancy VCC cannot be established, the primary attempts to establish a redundancy VCC with the peer in which the peer LES/BUS is kept in a dormant mode as long as the redundancy VCC is present. If the redundancy VCC is absent, the peer LES/BUS is activated to service the ELAN.

39 Claims, 9 Drawing Sheets

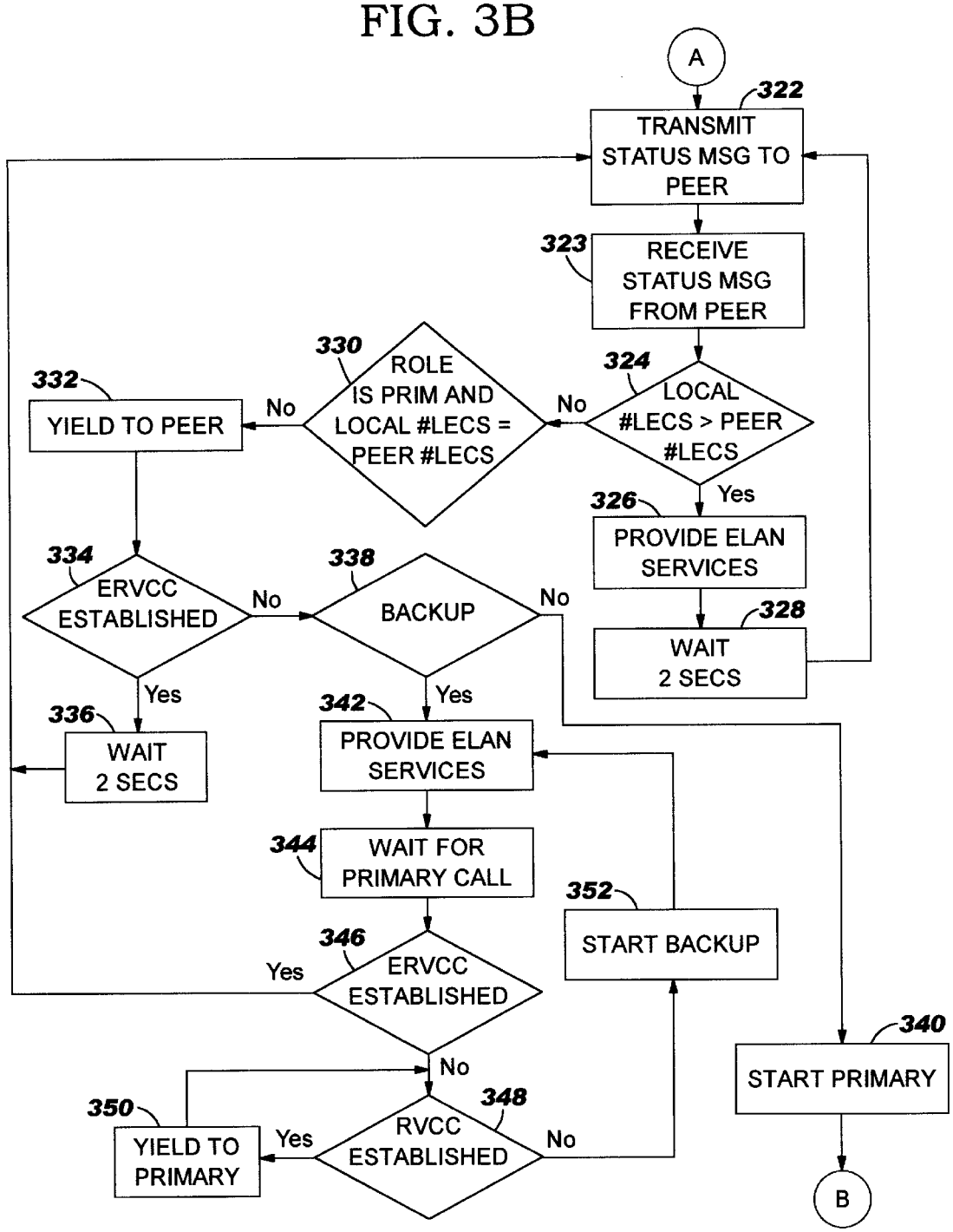

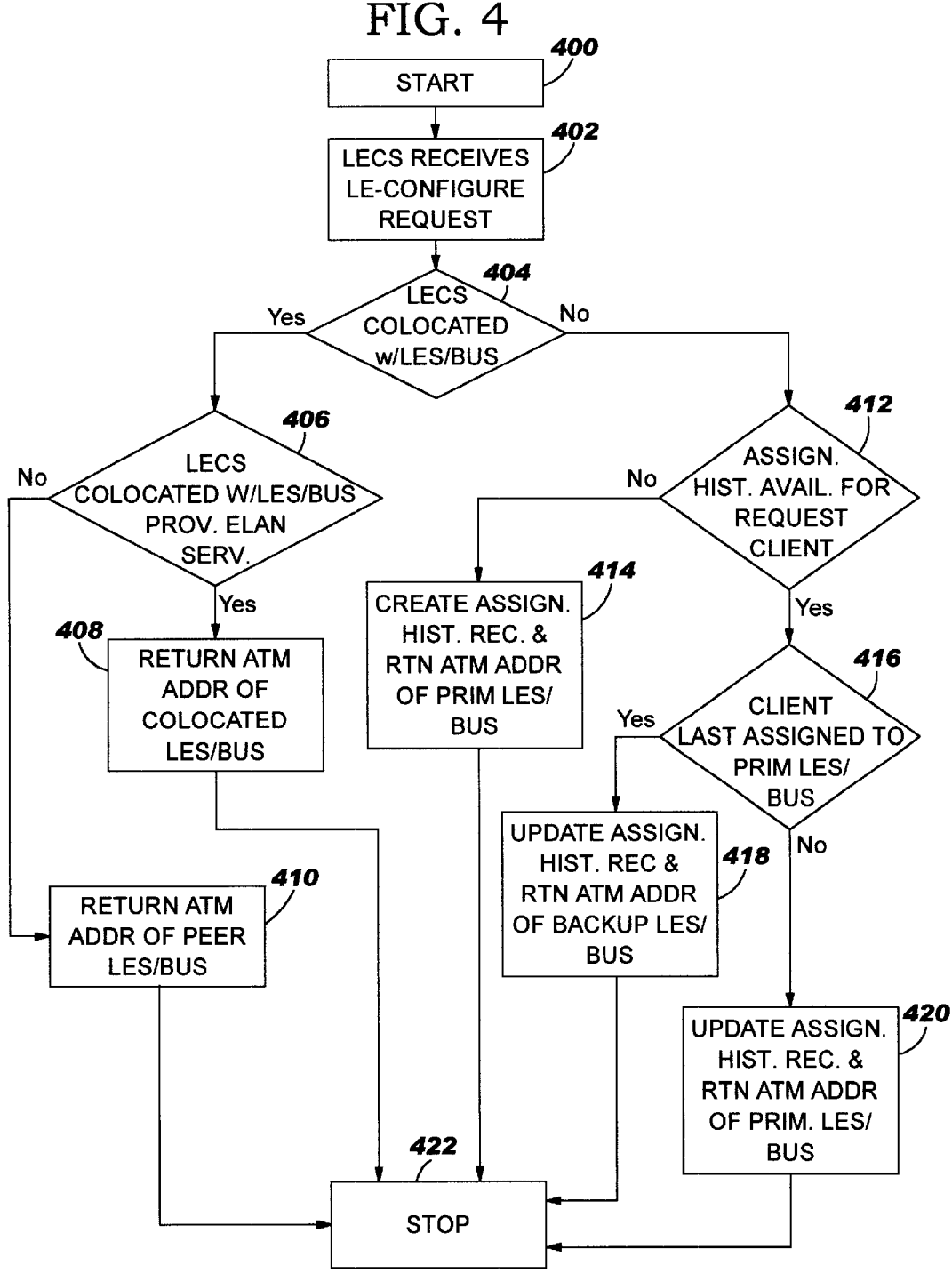

FIG. 5A

Primary LES/BUS ———(no connectivity)——— Backup LES/BUS
status=ACTIVE                              status=ACTIVE
# of LECs=5                                # of LECs=20

FIG. 5B

Primary LES/BUS —Enhanced Redundancy VCC— Backup LES/BUS
status=ACTIVE                              status=ACTIVE
# of LECs=5                                # of LECs=20 # of LECs=5
——————→ of LECs=20
                        ←——————

FIG. 5C

Primary LES/BUS —Enhanced Redundancy VCC— Backup LES/BUS
\*\*Received status status=ACTIVE
\*\*Terminated all LEC's (20>5)

status=REDUNDANT
\*\*SNED status of 0 LECs # of LECs=0 →

← # of LECs=20

FIG. 5D

Primary LES/BUS —Enhanced Redundancy VCC— Backup LES/BUS
status=REDUNDANT status=ACTIVE # of LECs=0 →

← # of LECs=25  \*\* 5 more LEC's
\*\* have joined

FIG. 6C

Primary LES/BUS  —Enhanced Redundancy VCC—  Backup LES/BUS
status=REDUNDANT                              status=ACTIVE
LECs=1                                      # LECs=25 of LECs=1
　　　　　　　　　　─────────▶ of LECs=25 **Buffer available
　　　　　　　　　　　　　　　◀─────────

**Received status
**Termianted all LEC's (25>1)
status=REDUNDANT of LECs=0
　　　　　　　　　　─────────▶
　　　　　　　　　　　　　　　# of LECs=25
　　　　　　　　　　　　　　　◀───────── of LECs=0
　　　　　　　　　　─────────▶

**Accepted new LEC
　　　　　　　　　　　　　　　# of LECs=26
　　　　　　　　　　　　　　　◀─────────

METHOD AND SYSTEM FOR PROVIDING PEER REDUNDANCY TO ASYNCHRONOUS TRANSFER MODE EMULATED LOCAL-AREA NETWORKS

CROSS REFERENCE TO RELATED APPLICATION

This application is related to co-pending and commonly assigned patent application METHOD AND SYSTEM FOR PROVIDING REDUNDANCY TO ASYNCHRONOUS TRANSFER MODE EMULATED LOCAL-AREA NETWORKS, Ser. No. 09/017,306, now U.S. Pat. No. 6,226,297, filed Jan. 30, 1997.

BACKGROUND OF THE INVENTION

The present invention relates in general to data processing systems, and more particularly, to a system and method for providing enhanced and peer redundancy modes for local-area network emulation servers in asynchronous transfer mode emulated local-area networks.

Asynchronous Transfer Mode (ATM) is an International Telecommunication Union-Telecommunication Standardization Sector (ITU-T) standard for cell relay in which information for multiple service types, such as voice, video, or data is conveyed in small, fixed sized cells. ATM networks are connection oriented. ATM was originally conceived as a high speed transfer technology for voice, video and data over public networks, but has been extended by the ATM Forum for use over both public and private networks. ATM is a cell-switching and multiplexing technology that combines the benefits of circuit switching with those of packet switching. It provides scalable bandwidth from a few megabits per second (Mbps) to many gigabits per second (Gbps).

An ATM network consists of a set of ATM switches interconnected by point-to-point ATM links or interfaces. ATM switches support two primary types of interfaces. User-Network Interface (UNI) is an ATM Forum specification that defines an interoperability standard for the interface between ATM-based products located in a private network and the ATM switches located within the public carrier networks. Network-to-Network Interface (NNI) is an ATM Forum standard that defines the interface between two ATM switches that are both located in a private network or are both located in a public network. The interface between a public switch and private one is defined by the UNI standard.

When an ATM device wants to establish a connection with another ATM device, it sends a signaling-request packet to its directly connected ATM switch. This request contains the ATM address of the desired ATM endpoint, as well as any Quality of Service (QoS) parameters required for the connection. ATM signaling protocols vary by the type of ATM link, which can be either UNI signals or NNI signals. UNI is used between an ATM end system and an ATM switch across an ATM UNI, and NNI is used across NNI links. A number of connection management method types, including set up, call proceeding, connect, and release are used to set up and break down an ATM connection.

LAN emulation (LANE) is a standard defined by the ATM Forum that gives the stations attached via ATM the same capabilities they normally obtain from legacy LANs, such as Ethernet and Token Ring. The function of a LANE protocol is to emulate a LAN on top of an ATM network and defines mechanisms for emulating either an IEEE 802.3 Ethernet or an IEEE 802.5 Token Ring LAN. The LANE protocol defines a service interface for network layer protocols that is identical to that of existing LANs. The LANE protocol resolves local area network media access control (MAC) addresses to ATM addresses. The LANE protocols operate transparently through ATM switches using only standard ATM signaling procedures. The LANE protocol defines the operation of a single emulated LAN (ELAN).

Each ELAN emulates either an Ethernet or a Token Ring local area network and consists of LAN emulation clients (LEC), LAN emulation server (LES), a broadcast and unknow server (BUS) and a LAN emulation configuration server (LECS). At LEC is an entity in an ATM end system that performs data forwarding, address resolution and registration of MAC addresses with the LES. An LES provides a central control point for LECs to forward registration and control information. There is only one LES for each ELAN. A BUS is a multicast server that is used to flood unknown destination address traffic and to forward multicast and broadcast traffic to clients within a particular ELAN. Each LEC is associated with only one BUS for each ELAN. An LECS maintains a database of LECs and the, ELANs to which they belong. The LECS accepts queries from LECs and responds with the appropriate ELAN identifier, i.e., the ATM address of the LES that serves the appropriate ELAN. There is one LECS that serves all ELANs within its domain. A virtual channel connection (VCC) is a logical circuit that carries data between two end points in an ATM network.

In LANE operation, an LEC first finds the LECS to obtain configuration information. This process starts when the LEC obtains its own ATM address, and typically occurs through address registration. An LEC joins an LES by registering its own ATM and MAC addresses. Once the LEC has joined an LES successfully, it finds the ATM address of the corresponding BUS to join the broadcast group and become a member of the emulated LAN. Actual data transfer between LECs involves resolving the ATM address of the destination LEC.

In the co-pending patent application referenced above, Ser. No. 09/017,306 which is hereby incorporated by reference, a method for providing redundancy to an ATM ELAN is disclosed. The ATM ELAN is served by a primary LES, a BUS, and an LECS. A backup LES/BUS is coupled to the ATM ELAN. A logical redundancy virtual channel connection (VCC), is then established between the primary LES/BUS and the backup LES/BUS. When the redundancy VCC is present between the primary LES/BUS and the backup LES/BUS, the backup LES/BUS is placed in a dormant mode. However, when the redundancy VCC is absent between the primary LES/BUS and the backup LES/BUS, the backup LES/BUS is activated to serve any request generated by the ATM ELAN.

Although the prior invention provided an improved method and system for providing redundancy to an ATM ELAN, it also presents certain shortcomings. A first limitation is the amount of time required to detect the failure of a partner LES/BUS. A second limitation is the disruption incurred as the result of a failure, and subsequent recovery, of the primary LES/BUS.

SUMMARY OF THE INVENTION

In view of the foregoing, it is therefore an object of the present invention to provide a method and system for enhancing redundancy to an ATM emulated local-area network.

It is another object of the present invention to provide a method and system for providing peer redundancy to an ATM emulated local area network.

The foregoing objectives are achieved in an Asynchronous Transfer Mode (ATM) emulated local area network (ELAN) served by a primary LAN emulation server (LES), a peer LAN emulation server, a broadcast and unknown server (BUS), and a LAN emulation configuration server (LECS) by establishing an enhanced peer redundancy virtual channel connection (VC) between the primary LES/BUS and the peer LES/BUS. The primary LES/BUS, once started, provides ELAN services to all of its LAN emulation clients (LECs) in the ELAN. It then attempts to establish an enhanced peer redundancy VCC with the peer LES/BUS. If successful, the primary LES/BUS and the peer LES/BUS start exchanging status messages every two seconds that indicate the number of LECs that are assigned to each LES/BUS. If the primary LES/BUS has fewer LECs than the peer LES/BUS, the primary LES/BUS yields to the peer (backup) LES/BUS as the active LES/BUS. The next time through the algorithm, the local LES/BUS is the backup LES/BUS and starts providing ELAN services to all LECs in the ELAN. If an enhanced redundancy VCC had not been established by the primary LES/BUS, then the backup LES/BUS provides ELAN services to all LECs in the ELAN while waiting for the primary LES/BUS to call the backup LES/BUS to establish an enhanced redundancy VCC. In the event that an enhanced peer redundancy VCC cannot be established between the primary LES/BUS and peer LES/BUS, the primary LES/BUS attempts to establish a redundancy VCC with the peer LES/BUS in which the peer LES/BUS is kept in a dormant mode as long as the redundancy VCC is present. If the redundancy, VCC is absent, the peer LES/BUS is activated to service the ELAN.

BRIEF DESCRIPTION OF THE DRAWINGS

The invention is better understood by reading the following detailed description of the preferred embodiment in conjunction with the accompanying drawings, wherein:

FIGS. 3A–3B illustrate the processing logic performed in order to provide enhanced peer redundancy to an emulated LAN, in accordance with a preferred embodiment of the present invention.

FIG. 4 illustrates the processing logic performed by the LECS in order for LECs to toggle between a primary LES/BUS and a backup LES/BUS, in accordance with a preferred embodiment of the present invention.

FIGS. 5A–5D illustrate an example of the exchange of status messages between a primary LES/BUS and a backup LES/BUS with an enhanced redundancy VCC established between them in accordance with a preferred embodiment of the present invention.

FIGS. 6A–6C illustrate an example of the exchange of status messages between a primary LES/BUS and a backup LES/BUS in which the backup LES/BUS initially lacks sufficient buffers to send its periodic status messages, in accordance with a preferred embodiment of the present invention.

DETAILED DESCRIPTION OF THE PREFERRED EMBODIMENT

Figure 1:
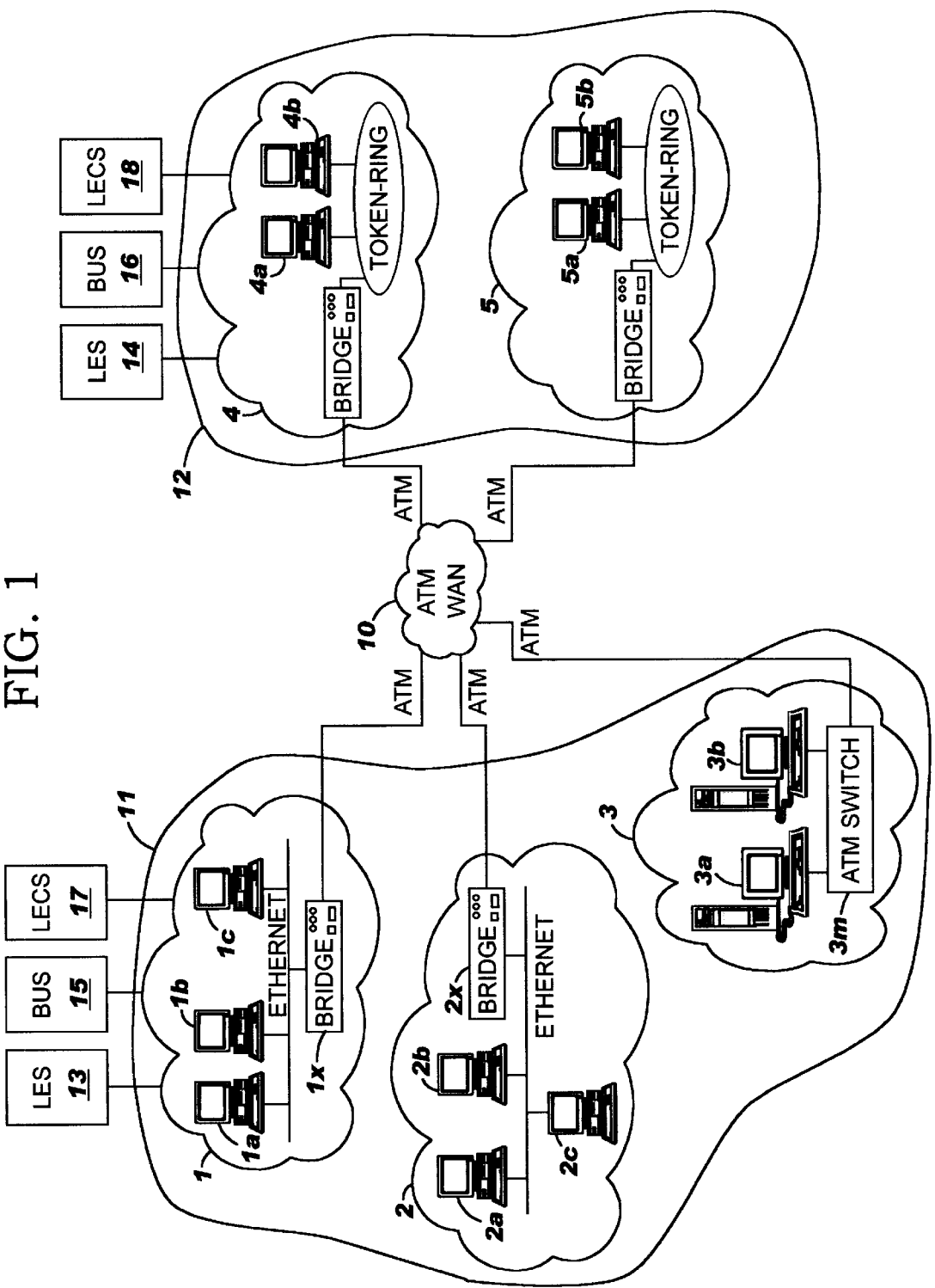
FIG. 1 illustrates an ATM ELAN network in which a preferred embodiment of the present invention may be incorporated.

An ATM LANE network in which the present invention can be implemented is depicted in FIG. 1. As illustrated, ELAN 11 and ELAN 12 are two separate emulated LANs. ELAN 11 which has sites 1, 2, and 3 is interconnected to ELAN 12, which has sites 4 and 5, via an Asynchronous Transfer Mode (ATM) wide area network (WAN) 10. Workstations 1A, 1B and 1C at site 1 are interconnected to each other via an Ethernet connection; workstations 2A, 2B and 2C of site 2 are interconnected to each other via another Ethernet connection, and workstations 3A and 3B of site 3 are connected directly to ATM switch 3M. Workstations 4A and 4B of site 4 are interconnected to each other via a Token Ring connection, and workstations 5A and 5B of site 5 are interconnected to each other via another Token Ring network.

ELAN 11 is served by a LANE server (LES) 13, a broadcast and unknown server (BUS) 15, and a LAN emulated configuration server (LECS) 17, while ELAN 12 is served by LES 14, BUS 16 and LECS 18. To provide control over ELAN 11, a bidirectional connection must be established between a LAN emulated client (LEC) within ELAN 11 and LES 13. Once the LEC has obtained an LES address from LECS 17, the LEC uses a join procedure to become a member of ELAN 11. After the LEC has joined and registered with LES 13, LES 13 can begin to provide information such as ATM addresses and MAC addresses to the LEC. BUS 15 provides a connection with data forwarding function such as broadcasting, multicasting and unicasting to any registered LEC. The LEC is also responsible for setting up a bidirectional connection to BUS 15, over which BUS 15 sends broadcast and multicast traffic to the LEC.

Figure 2:
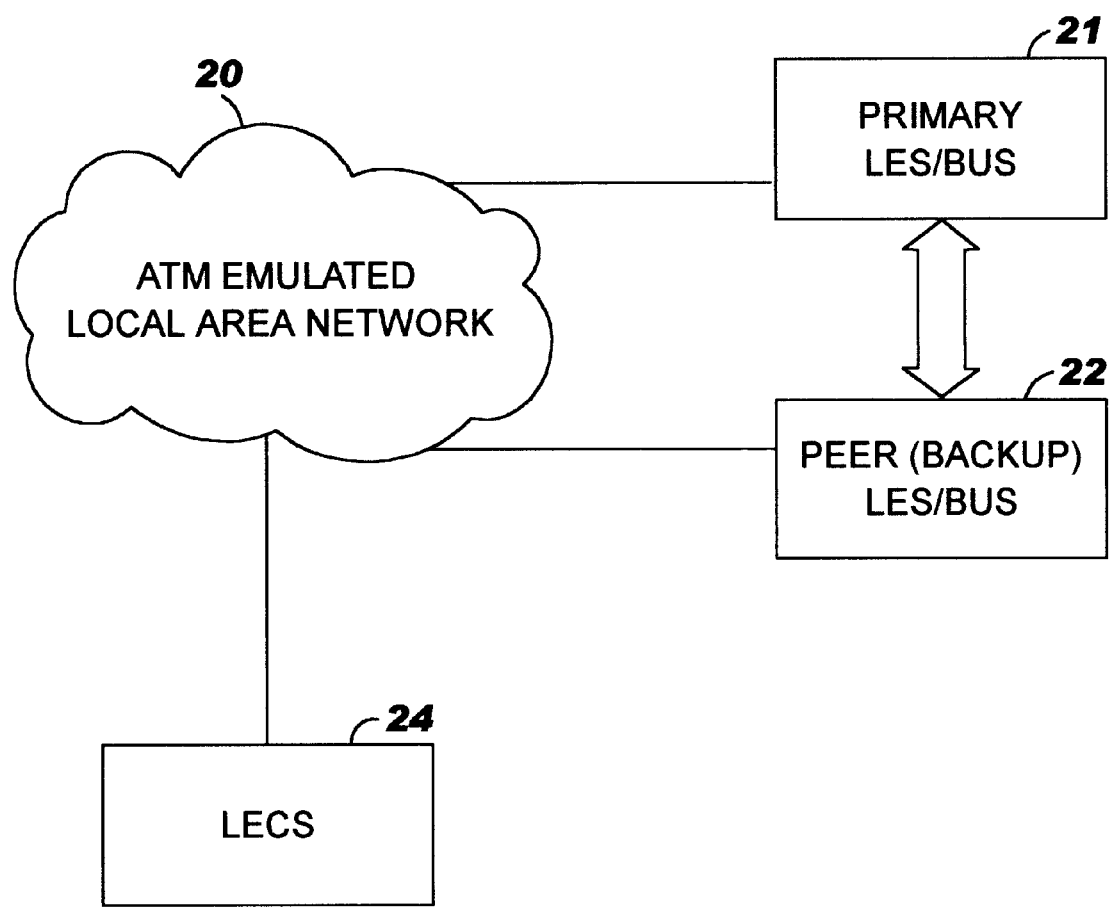
FIG. 2 is a block diagram of an ELAN having both a primary LES/BUS and a backup LES/BUS, in accordance with a preferred embodiment of the present invention.

FIG. 2 illustrates a preferred embodiment of the present invention in which a backup LES/BUS 22 is added to an emulated LAN 20 having a primary LES/BUS 21. Since every LEC within ELAN 20 must connect to both an LES and a BUS, the LES and BUS are depicted as a single unit in FIG. 2. However, the LES and BUS can be implemented either as a single unit or as two separate units as depicted in FIG. 1. A logical redundancy virtual channel connection (VCC) 23 is established between LES/BUS 21 and LES/BUS 22.

The primary LES/BUS 21 is responsible for establishing the redundancy VCC between the primary and backup LES/BUS. The presence of redundancy VCC 23 indicates that primary LES/BUS 21 is actively serving each ELAN 20, and that backup LES/BUS 22 is in a dormant mode. If the redundancy VCC 23 is absent, the backup LES/BUS 22 begins active servicing of requests from emulated LAN 20.

In order for the switch from primary LES/BUS 21 to backup LES/BUS 22 to be effective, LECs within ELAN 20 must detect the malfunction of the primary LES/BUS 21 and immediately connect to the LECS 24, and then to the backup LES/BUS 22. An LEC within ELAN 20 may detect a malfunction of the primary LES/BUS 21 via released VCCs. In the co-pending patent application, the LES/BUS redundancy support relied solely on the existence of a "redundancy VCC" between the primary LES/BUS 21 and the backup LES/BUS 22 to imply that the other LES/BUS was operational. In most failure modes, the redundancy VCC 23 is released quickly and take over by the backup LES/BUS 22 occurs. In some failure modes, a theoretical maximum of greater than 30 seconds is possible with current ATM signaling standards. To eliminate this exposure, the enhanced redundancy, support can detect other failure modes by having each LES/BUS 21, 22 transmit a status message to its partner every 2 seconds over an "enhanced redundancy" VCC. Overdue status messages can indicate a problem in the partner LES/BUS, even though the enhanced redundancy VCC appears to be operational. With enhanced redundancy, a LES/BUS will take over from its partner if two consecutive status messages are overdue. Thus, the time required to detect a failure of a partner LES/BUS is at most 6 seconds, even in obscure failure modes.

If status messages are transmitted across a redundancy VCC, it would be impossible to determine quickly if the operational code running in the partner LES/BUS has enhanced redundancy support. A lack of status messages can be either due to a failure of the partner or to having a release of to operational code on the LES/BUS that does not provide enhanced redundancy support. To, determine the capability oft a partner LES/BUS, an enhanced redundancy VCC having a different SNAP PID value is used. A partner server which does not have enhanced redundancy support will reject the unknown VCC type, providing immediate feedback to the primary LES/BUS 21. The backup LES/BUS 22 also has immediate feedback based on the SNAP PID of the VCC that is set up by the primary LES/BUS 21.

A primary LES/BUS 21 with enhanced redundancy support will try to establish the enhanced redundancy VCC 23 to the configured ATM address of the backup LES/BUS 22 every 5 seconds until it is either accepted or rejected. A rejection cause code of 88, implying an incompatible destination, indicates that the enhanced redundancy SNAP PID is not recognized by the backup LES/BUS 22. This would be the case if the operational code on the backup LES/BUS 22 does not contain enhanced redundancy support, or if the ATM address of the backup LES/BUS 22 has been misconfigured at the primary LES/BUS 21. When the enhanced redundancy VCC is rejected with a cause code of 88, a redundancy VCC is attempted immediately. If the enhanced redundancy VCC setup is not successful, it is retried every 5 seconds thereafter. If a redundancy VCC is released, an enhanced redundancy VCC will then be attempted.

LES/BUS peer redundancy improves stability in ATM ELAN using a backup LES/BUS by minimizing the disruption incurred as the result of a failure. In the co-pending patent application, a backup LES/BUS 22 takes over only during the time the primary LES/BUS 21 is unavailable. Therefore, a single failure typically results in two disruptions to the ELAN: one when the primary LES/BUS 21 becomes unavailable, and another when the primary LES/BUS 21 again becomes available, and the backup LES/BUS 22 yields to the primary. LES/BUS peer redundancy avoids the second disruption in most cases by allowing the backup LES/BUS 22 to retain its LECs even after the primary LES/BUS 21 becomes available.

A novel LES/BUS configuration option allows peer redundancy to be enabled in addition to the LES/BUS redundancy parameters disclosed in the co-pending patent application. A LES/BUS with redundancy enabled is configured as either a primary LES/BUS 21 or as a backup LES/BUS 22. To simplify the following description, only the primary LES/BUS 21 is considered to have a peer redundancy option implemented. The primary LES/BUS 21 is configured with the ATM address of the backup LES/BUS 22. Peer redundancy is disabled by default in order to maintain the primary-backup behavior of redundancy disclosed in the co-pending patent application.

LES/BUS peer redundancy can operate only if all of the following three criteria are met:
1. the primary LES/BUS 21 and the backup LES/BUS 22 are both running server operational code containing peer redundancy support;
2. the primary LES/BUS 21 has both the original redundancy and peer redundancy enabled; and
3. the backup LES/BUS 22 has the original redundancy enabled.

In network designs in which the location of the acting LES/BUS is a more important consideration than maximizing network stability, peer redundancy should be disabled. One such factor could be the existence of a wide area network (WAN) connection between the primary LES/BUS 21 and the backup LES/BUS 22. Another factor might be if tighter control is needed on the distribution of workload between a set of LANE servers in the steady state. In such environments where the location of the acting LES/BUS is critical, peer redundancy should be disabled since the primary LES/BUS 21 will be the acting LES/BUS whenever it is operational.

Figure 3A:
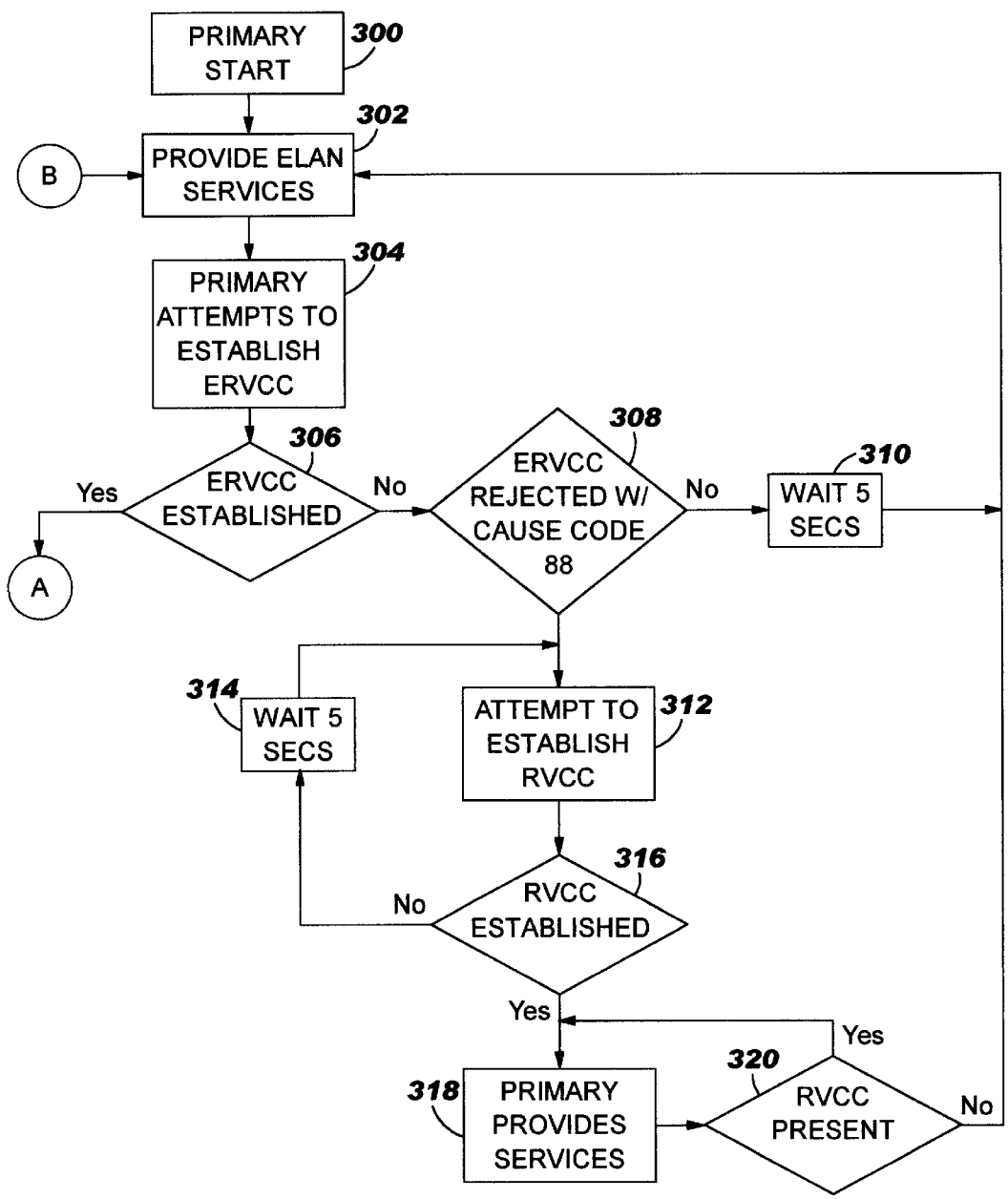

FIGS. 3A–3B illustrate the processing logic performed in order to provide enhanced peer redundancy to an emulated LAN. Processing begins in logic block 300 in which the primary LES/BUS 21 becomes active. In logic block 302 the primary LES/BUS 21 will start providing ELAN services to its LECs. In logic block 304 the primary LES/BUS 21 attempts to establish and enhanced redundancy VCC 23 with a peer (backup) LES/BUS 22. In decision block 306, a test is made to determine if the enhanced redundancy VCC was established. If it was not, decision block 308 is entered where a determination is made if the enhanced redundancy VCC was rejected with a cause code of "88". If the determination is negative, processing continues in block 310 where the primary LES/BUS 21 waits for 5 seconds and then returns to logic block 302 to continue to provide ELAN services to its LECs. If in decision block 308, an (enhanced redundancy VCC was rejected with a cause code of "88", the primary LES/BUS 21 attempts to establish a redundancy VCC as indicated in logic block 312. A test is made to determine if the redundancy VCC was established in decision block 316. If it was not established, then in logic block 314 the primary LES/BUS 21 waits for 5 seconds before returning to logic block 312 to again attempt to establish a redundancy VCC.

If a redundancy VCC was established in decision block 316, processing continues in logic block 318 in which the primary LES/BUS 21 provides services to all LECs in the ELAN. Since the redundancy VCC can be dropped for various reasons, in decision block 320 a test is made to determine if the redundancy VCC is still present. If is it not, then processing returns to logic block 302 in which the primary LES/BUS 21 provides ELAN services to all LECs before again attempting to establish an enhanced redundancy VCC 23. If in decision block 320, the redundancy VCC is determined to still be present, then processing loops back to logic block 318 in which the primary LES/BUS 21 continues to provide services to all LECs in the ELAN.

If an enhanced redundancy VCC 23 was established as determined in decision block 306, then processing continues in logic block 322 in which the primary LES/BUS 21 transmits a status message to a peer LES/BUS 22. This is followed in logic block 323 in which the active LES/BUS, currently the primary LES/BUS 21, receives a status message from the peer LES/BUS 22. In decision block 324, a test is made to determine if the number of LECs joined to the active LES/BUS (currently primary LES/BUS 21) is greater than the number of LECs joined to the peer LES/BUS 22. If the active LES/BUS has more LECs than the peer LES/BUS, processing continues in logic block 326 in which the active LES/BUS provides ELAN services to all of the LECs in the ELAN. The active LES/BUS waits for 2 seconds as indicated in logic block 328 before transmitting the next status message to the peer LES/BUS 22 as indicated by logic block 322.

If in decision block 324 it was determined that the active LES/BUS did not have more LECs than the peer LES/BUS 22, a test is made in decision block 330 to determine If the active LES/BUS is the primary LAS/BUS 21, and if the number of LECs associated with both the active LES/BUS and the peer LES/BUS 22 are equal. If they are, then processing continues in logic block 326 with the primary LES/BUS 21 providing ELAN services to all of the LECs in the ELAN. If in decision block 330, the peer LES/BUS 22 is determined to have more LECs than the active LES/BUS and the active LES/BUS is the primary LES/BUS, the primary LES/BUS 21 yields to the peer LES/BUS 22, as indicated in logic block 332. A test is made in decision block 334 to determine if an enhanced redundancy VCC 23 is established. If yes, then the active LES/BUS waits 2 seconds as indicated in logic block 336 before returning to logic block 322 to start transmitting status messages to the peer LES/BUS.

If a determination is made in decision block 334 that an enhanced redundancy VCC 23 is not established, then in decision block 338 a test is made to determine if the active LES/BUS is the backup LES/BUS. If it is not, then in logic block 340 the primary LES/BUS is started and processing i returns to logic block 302 in which the primary LES/BUS again provides ELAN services to its LECs. If in decision block 338 a determination is made that the active LES/BUS is the backup LES/BUS, processing continues in logic block 342 in which the backup LES/BUS provides ELAN services to all LECs in the ELAN. The backup LES/BUS waits for the primary LES/BUS to initiate a call as indicated by logic block 344. It should be noted that only the primary LES/BUS 21 can establish either an enhanced redundancy VCC or a redundancy VCC with a peer (backup) LES/BUS 22.

A test is made in decision block 346 to determine if enhanced redundancy VCC 23 is established. If it is, then processing returns to logic block 322 in which a status message is again transmitted to the peer LES/BUS. Otherwise, in decision block 348, a test is made to determine if a redundancy VCC is established. If a redundancy VCC is established, the backup LES/BUS 22 yields to the primary LES/BUS 21 as indicated in logic block 330 which loops back to decision block 348 to retest if the redundancy VCC remains established. If in decision block 348, a determination is made that a redundancy VCC is not established then processing continues with logic block 352 in which the backup LES/BUS 22 is started and then provides ELAN services as indicated in logic block 342.

FIG. 4 illustrates the processing logic performed in order for LAN emulation clients (LECs) joining the ELAN to toggle between a primary LES/BUS 21 and a backup LES/BUS 22. Starting from logic block 400, processing continues in logic block 402 in which LECS, 24 receives an LE CONFIGURE request from an LEC. A test is made in decision block 404 to determine if LECS 24 is co-located with either the primary 21 or the backup LES/BUS 22. If it is, then in decision block 406 a test is made to determine if the LECS 24 is co-located with the active LES/BUS currently providing ELAN services. If yes, then in logic block 408, the LECS 24 returns the ATM address of the co-located LES/BUS. Otherwise, the LECS 24 returns the ATM address of the peer LES/BUS as indicated in logic block 410. In either case, processing exits in logic block 422.

If in decision block 404, it is determined that the LECS is not co-located with either the primary LES/BUS 21 or the backup LES/BUS 22, then in decision block 412 a test is made to determine if there is a assignment history available for the requesting LANE client. If not, then in logic block 414 the LECS 24 creates an assignment history record for the LANE client and returns the address of the primary LES/BUS 21. Processing then exits in logic block 422. If in decision block 412, it is determined that as assignment history is available for the requesting LANE client, a test is made in decision block 416 to determine if the client was last assigned to the primary LES/BUS 21. If yes, then in logic block 418 the assignment history record is updated and the ATM address of the backup LES/BUS 22 is returned. If it is determined in decision block 416 that the client was last assigned to the backup LES/BUS 22, then in logic block 420 the assignment history record is updated and the ATM address of the primary LES/BUS 21 is returned. From logic blocks 418 and 420, processing exits at logic block 422.

Status messages that,are used as "keep alive" in LES/BUS enhanced redundancy are also used in peer redundancy to determine which peer LES/BUS should take over following an outage. For example, if the ATM LANE network is partitioned due to an outage such that the primary LES/BUS 21 and the backup LES/BUS 22 cannot establish connectivity of the enhanced redundancy VCC 23, it is possible for both primary LES/BUS 21 and backup LES/BUS 22 to have operational LANE clients (LECs). This scenario is depicted in FIG. 5A in which there is no connectivity between the primary LES/BUS 21 and backup LES/BUS 22. As indicated both primary LES/BUS 21 and backup LES/BUS 22 are active; five LECs are joined to primary LES/BUS 21, twenty LECs are joined to backup LES/BUS 22.

After ATM LANE connectivity is restored and an enhanced redundancy VCC 23 is established, a decision must be made as to which LES/BUS should take over all LECs so that the ELAN is no longer partitioned. In order to minimize the number of users that are impacted, the LES/BUS with the higher number of operational LECs will take over as the active LES/BUS. In the case where both the primary LES/BUS 21 and the backup LES/BUS 22 have an equal number of operational LECs, the primary LES/BUS 21 will take over. Therefore, the periodic status messages between the primary LES/BUS 21 and the backup LES/BUS 22 contain the number of operational LECs on the corresponding LES/BUS. This exchange of status messages is indicated by the scenario depicted in FIG. 5B.

In this scenario, the primary LES/BUS 21 determines that it only has five LECs compared with the backup LES/BUS 22 which has twenty LECs. Upon receiving the status message from the backup LES/BUS 22, the primary LES/BUS 21 terminates its five LECs and stops accepting new LECs. A status message from the primary LES/BUS 21 indicating no operational LECs is sent immediately after the primary LES/BUS 21 terminates its last LEC, rather than waiting for the next status message which may not occur for an additional two seconds. FIG. 5C illustrates the described situation.

In the present example, each of the five LECs, when terminated by the primary LES/BUS 21, will query the LECS 24 for a LES ATM address. If the LECS 24 is co-located in the same server as either the primary LES/BUS 21 or the backup LES/BUS 22, the LECS 24 will return the ATM address of the backup LES/BUS 22 since it queries the state of the co-located LES/BUS 21. If the LECS 24 is located in a different server, the LECS 24 will first return the ATM address of the primary LES/BUS 21, which the LEC will not be able to join. Each LEC will then query the LECS 24 again. Since the LECS 24 maintains a short term memory of the ATM address of the LES/BUS last provided to each LEC, the LECS 24 will return the ATM address of the backup LES/BUS 22. This situation is illustrated in FIG. 5D in which the five LECs have joined the backup LES/BUS 22.

Figure 6A:
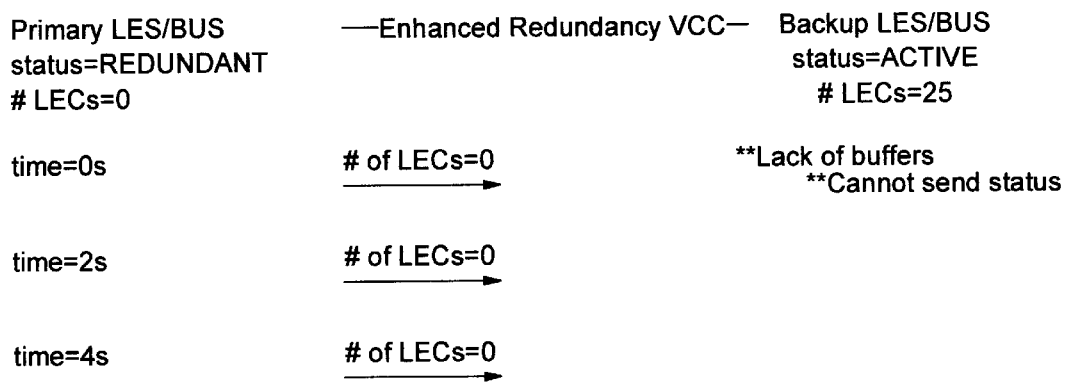

Since both the primary LES/BUS 21 and the backup LES/BUS 22 periodically transmit status messages, the peer redundancy algorithm described above is self correcting. Continuing with the same example in which the primary LES/BUS 21 yields to the backup LES/BUS 22 which now has 25 LECs, FIG. 6A depicts the scenario in which LES/BUS 22 is temporarily unable to transmit status messages due to a lack of buffers.

Figure 6B:
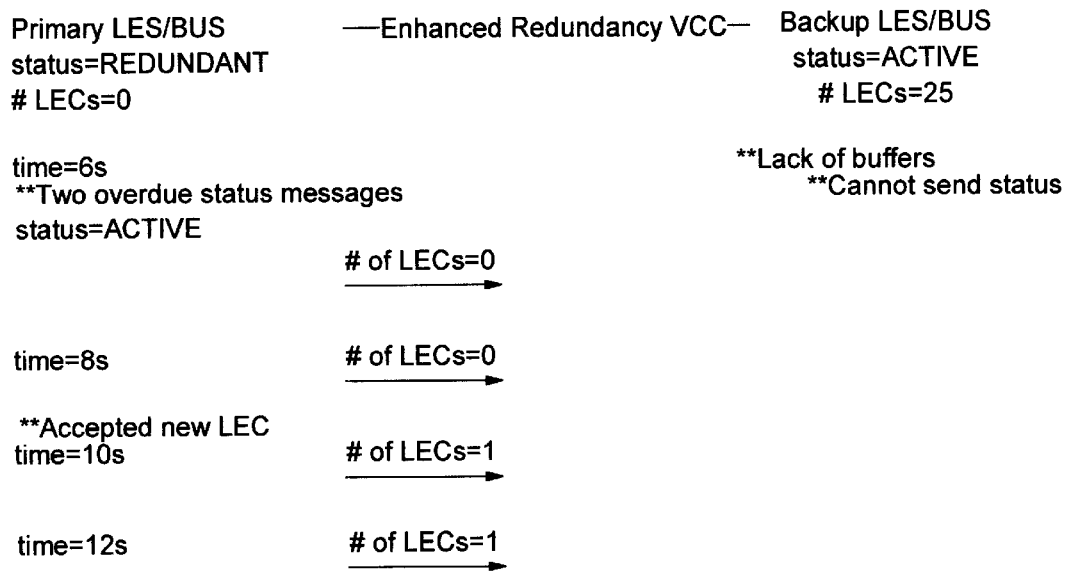

In this situation, the primary LES/BUS 21 will take over from the backup LES/BUS 22 once two consecutive status messages from the backup LES/BUS are overdue. A new LEC trying to join the ELAN 20 could be assigned to the primary LES/BUS 21 by a LECS 24 that is not co-located with the backup LES/BUS 22. The primary LES/BUS 21 will now accept the new LEC. This situation is depicted in FIG. 6B.

If the backup LES/BUS 22 again has buffers available, it will start transmitting its status messages again. When the primary LES/BUS 21 receives a status message from the backup LES/BUS 22, the primary LES/BUS 21 will yield, since/the backup LES/BUS 22 has a greater number of LECs, and terminate its one LEC. This LEC will then query LECS 24 again for the ATM address of an LES/BUS, and will be given the ATM address of the backup LES/BUS 22. This situation is depicted in FIG. 6C in which the backup LES/BUS 22 ends up with all 26 LECs.

Preference is given to the primary LES/BUS 21 in cases where both the primary LES/BUS 21 and the backup LES/BUS 22 are recovering from the same outage, for example, an ATM switch failure, a power failure, etc. Each LES/BUS 21, 22 records the time when it last registered itself with the ATM switch and became operational. If the backup LES/BUS 22 has been operational less than one minute when the enhanced redundancy VCC 23 is established, the backup LES/BUS 22 automatically yields to the primary LES/BUS 21. On the other hand, if the backup LES/BUS 22 has been operational and ready to accept new LECs for more than a minute when the enhanced redundancy VCC 23 is established, the status messages are exchanged and the LES/BUS with the higher number of operational LECs will take over as the active LES/BUS as described above.

As an additional feature, a new operator console command called "takeover" can be invoked at the primary LES/BUS 21 to request a take over from an active backup LES/BUS 22. In the event that a primary LES/BUS 21 is currently yielding to an active backup LES/BUS 22 in a peer redundancy configuration, the user at the operator console may want to use this command at the primary LES/BUS 21 console to send a take over request to the backup LES/BUS 22. Upon receipt of this request, the backup LES/BUS 22 terminates all LECs and yields to the primary LES/BUS.

For ease of discussion, the enhanced and peer redundancy mechanism of the present invention has been described in terms to of a primary and a peer LES/BUS. It does not matter what labels are applied to the pair of LAN emulation servers that are associated with an ELAN. They could have as easily been referred to as primary and backup, active and standby, first peer and second peer, local and peer, etc. The one designated as primary is the LES that has the enhanced peer redundancy function implemented, although the other LES can also have the function implemented. Again, for simplicity, the term LES/BUS was used throughout the discussion, since in many operational implementations they are co-located. It is the LES that is actually of concern in the invention. Furthermore, in the preferred embodiment, the number of LECs that are joined to each LES is the factor used to determine which LES will be the active LES for the ELAN. This choice of evaluation criterion is a matter of design choice; other choices might include the number of media access control (MAC) addresses explicitly registered to each LES, the number of MAC addresses of network devices that are actually sending data traffic to the BUS, or a combination of the number of LECs and number of MAC addresses. Those skilled in the art will immediately recognize other evaluation criteria on which to base designation of the active LES.

The enhanced and peer redundancy mechanism of the present invention has been described as a computer program that can be resident on one or more host computers such as network devices or servers. As such, the enhanced and peer redundancy mechanism for LANE can be stored as an application on any network device or server. It is important to note, however, that those skilled in the art will appreciate that the mechanisms of the present invention are capable of being distributed as a program product in a variety of forms, and that the present invention applies equally regardless of the particular type of signal bearing media being utilized to actually carry out the distribution. Examples of signal bearing media include, without limitation, recordable type media such as cassettes or CD ROMs and transmission type media such as analog or digital communication links.

Additionally corresponding structures, materials, acts, and equivalents of all means plus function elements in the claims below are intended to include any structure, material, or acts for performing the functions in combination with other claimed elements as specifically claimed.

While the invention has been particularly shown and described with reference to a preferred embodiment thereof, it will be understood by those skilled in the art that various changes in form and detail may be made without departing from the spirit and scope of the present invention.

What is claimed is:

1. A method to provide enhanced peer redundancy to an Asynchronous Transfer Mode (ATM) emulated local area network (ELAN) wherein the ELAN is served by a primary LAN emulation server (LES), a broadcast and unknown server (BUS) and a LAN emulation configuration server (LECS), the method comprising the steps of:

coupling a peer LES/BUS to the ELAN;

establishing an enhanced peer redundancy virtual channel connection (VCC) between the primary LES/BUS and the peer LES/BUS;

transmitting a plurality of status messages between the primary LES/BUS and the peer LES/BUS;

comparing a first number of LAN emulation clients (LECs) joined with the primary LES/BUS and a second number of LECs joined with the peer LES/BUS; and providing ELAN services to all of the LECs in the ELAN by the LES/BUS having a greater number of joined LECs.

2. The method to provide enhanced peer redundancy of claim 1 wherein the step of transmitting a plurality of status messages includes both the primary LES/BUS and the peer LES/BUS transmitting status messages to each other asynchronously at least every two seconds, each status message containing the number of LECs joined to the corresponding LES/BUS.

3. The method to provide enhanced peer redundancy of claim 1 wherein the step of establishing an enhanced peer redundancy VCC is performed by the primary LES/BUS.

4. The method to provide enhanced peer redundancy of claim 1 wherein if the enhanced peer redundancy VCC is rejected by the peer LES/BUS, the primary LES/BUS initiates a redundancy VCC with the peer LES/BUS that, if successful, enables the primary LES/BUS to become an active LES/BUS and places the peer LES/BUS in a dormant mode.

5. The method to provide enhanced peer redundancy of claim 4 wherein the active LES/BUS provides ELAN services to each requesting LEC in the ELAN.

6. The method to provide enhanced peer redundancy of claim 5 wherein if an enhanced peer redundancy VCC cannot be establised or the peer LES/BUS has more joined LECs than the primary LES/BUS, enabling the peer LES/BUS to become the active LES/BUS.

7. The method to provide enhanced peer redundancy of claim 4 wherein the peer LES/BUS becomes the active LES/BUS if the redundancy VCC between the primary LES/BUS and the peer LES/BUS is disconnected until such time that an enhanced peer redundancy VCC or a redundancy VCC is re-established.

8. The method to provide enhanced peer redundancy of claim 1 wherein if one of either the primary LES/BUS or the peer LES/BUS is unable to transmit two consecutive status messages to the other LES/BUS, the other LES/BUS takes over providing ELAN services to any new LEC that joins the ELAN at least until the one LES/BUS is again able to transmit status messages.

9. The method to provide enhanced peer redundancy of claim 1 further including the step of querying the LECS to determine if it is co-located with either the primary LES/BUS or the peer LES/BUS.

10. The method to provide enhanced peer redundancy of claim 9 wherein if the LECS is co-located with the LES/BUS providing ELAN services, returning an ATM address of the co-located LES/BUS.

11. The method to provide enhanced peer redundancy of claim 9 wherein if the LECS is co-located with the LES/BUS not providing ELAN services, returning an ATM address of the other LES/BUS.

12. The method to provide enhanced peer redundancy of claim 1 further including the step of an operator invoking a command at an operator console associated with the primary LES/BUS to take over control of all LECs in the ELAN from an active peer LES/BUS.

13. The method to provide enhanced peer redundancy of claim 12 further including the step of the active peer LES/BUS terminating all of its LECs and yielding to the primary LES/BUS upon receipt of the takeover command.

14. A computer program product adaptable for storage on a program storage media at a network device, the computer program product operable for providing enhanced peer redundancy to an Asynchronous Transfer Mode (ATM) emulated local area network (ELAN) wherein the ELAN is served by a primary LAN emulation server (LES), a broadcast and unknown server (BUS) and a LAN emulation configuration server (LECS), the computer program product comprising:

program code for coupling a peer LES/BUS to the ELAN;
program code for establishing an enhanced peer redundancy virtual channel connection (VCC) between the primary LES/BUS and the peer LES/BUS;
program code for transmitting a plurality of status messages between the primary LES/BUS and the peer LES/BUS;
program code for comparing a first number of LAN emulation clients (LECs) joined with the primary LES/BUS and a second number of LECs joined with the peer LES/BUS; and
program code for providing ELAN services to all of the in the ELAN by the LES/BUS having a greater number of joined LECs.

15. The computer program product of claim 14 wherein the program code for transmitting a plurality of status messages includes program code for both the primary LES/BUS and the peer LES/BUS to transmit status messages to each other asynchronously at least every two seconds, each status message containing the number of LECs joined to the corresponding LES/BUS.

16. The computer program product of claim 14 wherein the program code for establishing an enhanced peer redundancy VCC is executed by the primary LES/BUS.

17. The computer program product of claim 14 including program code for the primary LES/BUS to initiate a redundancy VCC with the peer LES/BUS, if the enhanced peer redundancy VCC is rejected by the peer LES/BUS, and that enables the primary LES/BUS to become an active LES/BUS and places the peer LES/BUS in a dormant mode.

18. The computer program product of claim 14 including program code to enable the active LES/BUS provide ELAN services to each requesting LEC in the ELAN.

19. The computer program product of claim 18 including program code for enabling the peer LES/BUS to become the active LES/BUS, if an enhanced peer redundancy VCC cannot be established or the peer LES/BUS has more joined LECs than the primary LES/BUS.

20. The computer program product of claim 17 including program code for the peer LES/BUS to become the active LES/BUS if the redundancy VCC between the primary LES/BUS and the peer LES/BUS is disconnected until such time that an enhanced peer redundancy VCC or a redundancy VCC is re-established.

21. The computer program product of claim 14 including program code for one of either the primary LES/BUS or the peer LES/BUS to take over providing ELAN services to any new LEC that joins the ELAN at least until the other LES/BUS is again able to transmit status messages, if the other LES/BUS is unable to transmit two consecutive status messages to the one LES/BUS.

22. The computer program product of claim 14 further including the program code for querying the LECS to determine if it is co-located with either the primary LES/BUS or the peer LES/BUS.

23. The computer program product of claim 22 including program code for returning an ATM address of co-located LES/BUS, if the LECS is co-located with the LES/BUS providing ELAN services.

24. The computer program product of claim 22 including program code for returning an ATM address of the other LES/BUS, if the LECS is co-located with the LES/BUS not providing ELAN services.

25. The computer program product of claim 14, further including program code to invoke a command at an operator console associated with the primary LES/BUS to take over control of all LECs in the ELAN from an active peer LES/BUS.

26. The computer program product of claim 25 further including program code for enabling the active peer LES/BUS to terminate all of its LECs and yield to the primary LES/BUS upon receipt of the takeover command.

27. A system to provide enhanced peer redundancy to an Asynchronous Transfer Mode (ATM) emulated local area network (ELAN) wherein the ELAN is served by a primary LAN emulation server (LES), a broadcast and unknown server (BUS) and a LAN emulation configuration server (LECS), the system comprising:

means for coupling a peer LES/BUS to the ELAN;
means for establishing an enhanced peer redundancy virtual channel connection (VCC) between the primary LES/BUS and the peer LES/BUS;

means for transmitting a plurality of status massages between the primary LES/BUS and the peer LES/BUS;

means for comparing a first number of LAN emulation clients (LECs) joined with the primary LES/BUS and a second number of LECs joined with the peer LES/BUS; and means for providing ELAN services to all of the LECs in the ELAN by the LES/BUS having a greater number of joined LECs.

28. The system to provide enhanced peer redundancy of claim 27 wherein the means for transmitting a plurality of status messages includes means at the primary LES/BUS and the peer LES/BUS for transmitting status messages to each other asynchronously at least every two seconds, each status message containing the number of LECs joined to the corresponding LES/BUS.

29. The system to provide enhanced peer redundancy of claim 27 wherein the means for establishing an enhanced peer redundancy VCC is located at the primary LES/BUS.

30. The system to provide enhanced peer redundancy of claim 27 including means for the primary LES/BUS to initiate a redundancy VCC with the peer LES/BUS that enables the primary LES/BUS to become an active LES/BUS and places the peer LES/BUS in a dormant mode if the enhanced peer redundancy VCC is rejected by the peer LES/BUS.

31. The system to provide enhanced peer redundancy of claim 30 including means for the active LES/BUS to provide ELAN services to each requesting LEC in the ELAN.

32. The system to provide enhanced peer redundancy of claim 31 including means for enabling the peer LES/BUS to become the active LES/BUS if an enhanced peer redundancy VCC cannot be established or the peer LES/BUS has more joined LECs than the primary LES/BUS.

33. The system to provide enhanced peer redundancy of claim 30 including means for the peer LES/BUS to become the active LES/BUS if the redundancy VCC between the primary LES/BUS and the peer LES/BUS is disconnected until such time that an enhanced peer redundancy VCC or a redundancy VCC is re-established.

34. The system to provide enhanced peer redundancy of claim 27 including means for one of either the primary LES/BUS or the peer LES/BUS to take over providing ELAN services to any new LEC that joins the ELAN at least until the other LES/BUS is again able to transmit status messages if the other LES/BUS is unable to transmit two consecutive status messages to the one LES/BUS.

35. The system to provide enhanced peer redundancy of claim 27 further including means for querying the LECS to determine if it is co-located with either the primary LES/BUS or the peer LES/BUS.

36. The system to provide enhanced peer redundancy of claim 35 including means for returning an ATM address of the co-located LES/BUS if the LECS is co-located with the LES/BUS providing ELAN services.

37. The system to provide enhanced peer redundancy of claim 35 including means for returning an ATM address of the other LES/BUS if the LECS is co-located with the LES/BUS not providing ELAN services.

38. The system to provide enhanced peer redundancy of claim 27 further including a user interface to invoke a command operator console associated with the primary LES/BUS to take over control of all LECs in the ELAN from an active peer LES/BUS.

39. The system to provide enhanced peer redundancy of claim 38 further including means for the active peer LES/BUS to terminate all of its LECs and yield to the primary LES/BUS upon receipt of the takeover command.

* * * * *